Figure 1:
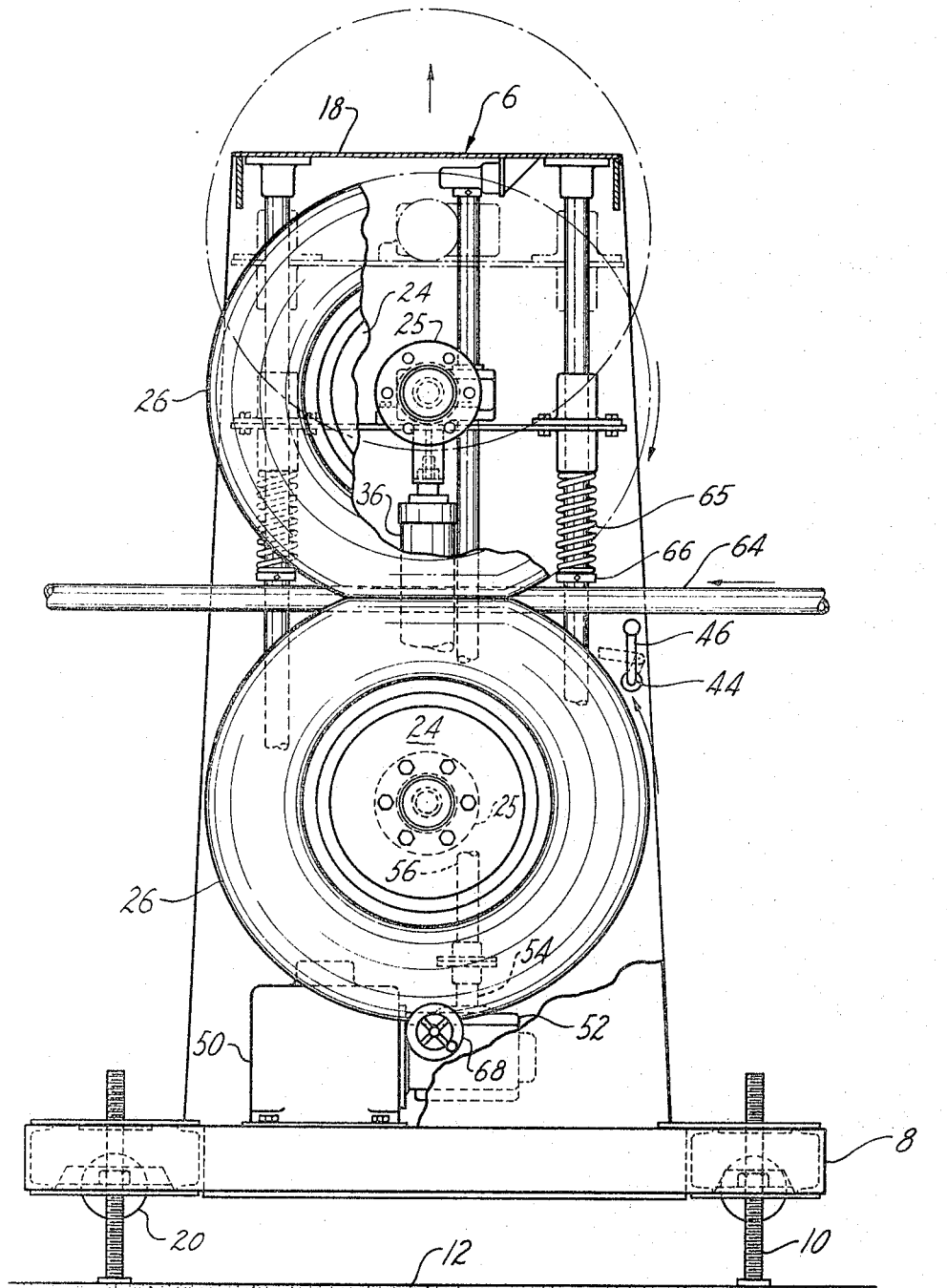

INVENTOR.
JOHN C. REIB

ATTORNEY

United States Patent Office 3,310,210
Patented Mar. 21, 1967

3,310,210
PULLING DEVICE
John C. Reib, P.O. Box 788, Franklin, Pa. 16323
Continuation of abandoned application Ser. No. 327,605,
Dec. 3, 1963. This application Mar. 7, 1966, Ser. No.
542,979
6 Claims. (Cl. 226—1)

This application is a continuation of Ser. No. 327,605, filed Dec. 3, 1963 and now abandoned.

This invention relates to a pulling device and more particularly to a puller designed for pulling newly formed plastic pipe from an extrusion device through a vacuum sizer.

Pipe pullers of various designs are well known in the art of manufacturing plastic pipe and have proven satisfactory under some conditions. Such devices of the prior art have suffered mainly from the disadvantages of not being readily or rapidly adjustable to accommodate variations in the size of the pipe, especially those variations associated with the start-up of the pipe forming process. At start-up the first portion of pipe being formed is likely to be a small diameter, more or less solid, rope of plastic material extending from the extrusion device through the vacuum sizer dies into the puller apparatus. Such material is usable only as a means for applying tension at a controlled rate to the tubing later emitted by the extrusion device and having the desirable size applied by the vacuum sizer to form usuable pipe. A typical situation would find a rope of plastic material of a diameter of approximately one-half inch constituting the primary material being fed into the puller apparatus to begin the formation of a pipe of perhaps four inches in diameter. Under such conditions it will be seen that resilience and adjustability are prime requisites of the gripping surfaces in the puller apparatus.

Another set of circumstances in which rapid adjustability is necessary occurs when certain conditions associated with the extrusion device cause the formation of a slug or blob of plastic material as part of the rope of plastic material between the forming die of the extrusion device and the pulling apparatus and having a diameter much greater than that of the rope of plastic material. With devices of the prior art such a slug usually stopped the pulling action and gave rise to the necessity for restarting the whole process. The present device is designed to accommodate such slugs or blobs without interrupting the pulling action. All of the above described accommodations to the variations in size between rope and pipe or between rope and slug of material are accomplished without change in the pulling speed and without substantial change in gripping force exerted upon the material being pulled.

A further disadvantage of prior devices, overcome by the apparatus of the present invention, is flattening of the pipe when, due to variations in extrusion conditions, the wall of the pipe becomes thinner than normal. The present device applies gripping force of substantially uniform pressure over an area of the pipe much greater than that utilized by prior machines of equivalent size and thus less tendency to flatten the pipe when thin walled pipe is being produced.

The apparatus of the present invention comprises a pair of automotive type wheels provided with the usual pneumatic tires and journaled on parallel axles with the tread surfaces of the tires in contact with each other. Butyl rubber tires such as commonly used on aircraft have been found most satisfactory because of greater softness and flexibility. The two wheels are synchnonously driven in counter-rotation so that a piece of pipe or other elongated object placed in contact with the treads on one side of the machine will be drawn through between the treads of the tires in a smooth continuous motion. The axis of one of the wheels is fixed while the other wheel, usually the upper one, is journaled on an axle transversely movable with relation to the axis of the lower wheel and controlled in such motion by a fluid operated extensible cylinder under either automatic or manual control to regulate the distance between the tread surfaces and to control the pressure applied by the tread surfaces to any object passing between them.

Figure 2:
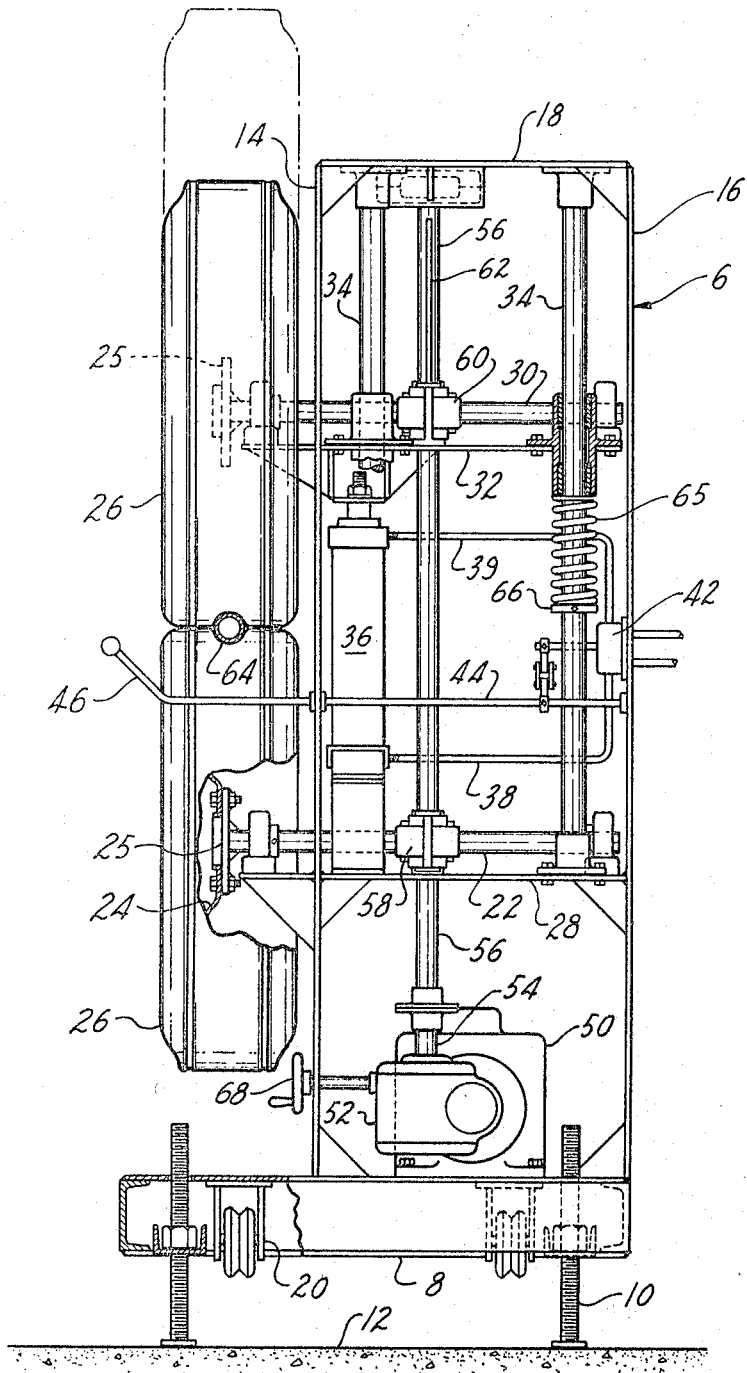

These and other advantages of the present invention will become more readily apparent on further consideration of the following description and drawings in which:

FIG. 1 is a side elevational view partly in section of a pulling apparatus constructed according to the principles of this invention; and FIG. 2 is a front elevational view partly in section of the device shown in FIGURE 1.

In FIGURE 1 there is shown a pulling apparatus constructed according to the principles of this invention and comprising a generally rectangular frame structure 6 having a base portion 8 supported by a plurality of adjustable legs 10 on a generally horizontal floor surface 12 so that adjustment of height to maintain a constant centerline for different pipe diameters and leveling of the frame structure 6 can be accomplished by the adjusting of the legs 10. Extending upwardly from the base portion 8 and rigidly secured thereto is a pair of generally parallel spaced substantially rectangular side plates 14 and 16 being left and right side plates respectively, as viewed in FIGURE 2. A flat generally rectangular top plate 18 is rigidly secured at the top edges of the side plates 14 and 16 to which the top plate 18 is joined by suitable corner bracing to form the rigid frame structure 6. The base portion 8 is provided with a plurality of casters or wheels 20 to support the apparatus when the legs 10 are retracted and provide for mobility of the apparatus when it becomes necessary to move the apparatus from one place to another. An elongated horizontal shaft or lower axle 22 spaced upwardly from the base portion 8 and parallel thereto is suitably journaled and rotatably supported by bearing members mounted on a horizontal lower frame 28 rigidly secured to and supported by the side plates 14 and 16. The lower axle 22 extends transversely across the frame structure 6 from a point inwardly adjacent the righthand side plate 16 through the lefthand side plate 14 and far enough therebeyond to provide for mounting of an automotive type wheel 24 upon a hub disc 25 rigidly secured to the lefthand end of the lower axle 22 and drivingly rotatable therewith. An automotive pneumatic tire 26 is mounted on the wheel 24 in the usual manner and inflated to a pressure determined by the desired amount of wrap around and gripping force, normally only a few pounds per square inch.

The tires are desirably inflated to only a few pounds per square inch and as a consequence readily conform to the shape of the pipe to such a degree that on pipe of 4½ inch diameter each tire can contact an area measuring approximately 3 inches (circumferentially) by 12 to 14 inches (axially) for a total contact area of more than 70 square inches for both tires. Such a contact area could be achived by prior devices only by lengthening the machine to five feet or more as compared with a length of approximately 30 inches for the apparatus of the present invention. The amount of contact area is readily controlled by adjusting the tire pressure relative to the pressure supplied to the extensible cylinder.

Because the present device employs soft tires mounted on rims, rather than belts trained about crowned pulleys as in prior devices, guide rollers mounted laterally of the pipe to prevent wandering are unnecessary.

An upper axle 30 similar to axle 22, parallel thereto and upwardly spaced therefrom, is similarly provided with a hub disc 25, a wheel 24 and a tire 26. The upper axle 30 is journaled in the same manner as lower axle 22 excepting only that the bearing elements rotatably supporting the upper axle 30 are suitably mounted upon an upper frame 32 slidably mounted on a plurality of elongated, vertical guide elements 34 extending from the lower frame 28 to the top plate 18 and rigidly secured thereto. The frame 32 is vertically adjustable and controlled in such adjustment by an elongated fluid actuated extensible cylinder 36 having a base portion supported by the lower frame 28 and extensible rod and rigidly connected to the under side of the upper frame 32 so that suitable activation of the cylinder 36 can raise the upper axle 30 to any desired height while activation of the cylinder 36 in the opposite direction can lower the upper tire 26 into contact with the lower tire 26 and apply any desired amount of downward force thereto. Suitable fluid conducting connections 38 and 39 connect the base end and the rod end respectively of the cylinder 36 to a remote valve means, not shown, of a type well known in the art for selectively pressurizing either the rod end or the base end of the cylinder 36 to accomplish upward and downward adjustment of the upper axle 30. The connections 38 and 39 communicate with a manually operated reversing valve 42 of a type well known in the art whereby the communication of the connections 38 and 39 with the remote valve can be reversed by actuation of the reversing valve 42 so that the pressure nominally applied to the rod end connection 39 can be instantaneously transferred to pressurize the base end connection 38. The manual control of the reversing valve 42 is connected by suitable levers and linkage to an elongated shaft 44 extending transversely of the frame structure 6 from the righthand side plate 16 through the lefthand side plate 14 and out beyond the lower tire 26 where it terminates in a ball ended upwardly extending handle member 46 which extends upwardly near the plane of contact of the upper tire and lower tire 26 and is so located forwardly of the contacting portions of these tires as a control handle or a safety device which is activated by pressure of a workman's arm, for example, traveling toward the contact area which causes the shaft 44 to rotate in a counterclockwise direction as seen in FIGURE 1. Such rotation of the shaft 44 activates reversing valve 42 transferring pressure from the rod end connection 39 to the base end connection 38 and results in lifting of the upper tire 26 out of contact with the lower tire 26 so that no injury to the workman results.

A suitable motor 50 is mounted on the base portion 8 and is drivingly connected either directly or by sprocket and chain (not shown) to a variable speed reducing gear unit 52 having a vertically upwardly extending output shaft 54 coupled to an elongated vertically extending drive shaft 56 the top end of which is suitably rotatably journaled at the under side of the top plate 18 for rotation about a vertical axis in a well known manner. An angle drive lower gear box 58 mounted on the lower axle 22 drivingly connects the drive shaft 56 with the lower axle 22 to provide variable speed rotation thereto. The drive shaft 56 extends upwardly through the upper frame 32 and is slidably drivingly engaged in an angle drive gear box 60 mounted on the upper axle 30 to drivingly connect the drive shaft 56 and the upper axle 30 for powered variable speed rotation of the axle 30. It is of course necessary that an elongated keyway such as that shown at 62 on the upper part of the drive shaft 56 or a plurality of elongated splines be provided so that the angle drive gearbox 60 can be elevated and lowered without losing tis driving connection to the drive shaft 56.

A manually operated control handle 68 is shown mounted on the gear unit 52 to provide selective speed control for the tires 26 since speed control is vital in many pulling operations. Such control can be of the remote type and mounted at any convenient position.

The device of this invention is usable for the application of continuous tension to various elongated objects of different or varying cross section including rectangular and triangular shapes, but operation of this device will be described in relation to the production of plastic pipe to avoid cumbersome circumlocutions.

In operation the device of this invention is placed adjacent a means for forming a plastic object such as a vacuum sizer as described in my copending application Serial No. 306,554, filed September 4, 1963, and is spaced from and aligned with such source by proper activation of the adjustable legs 10 and a spacing element (not shown) to prevent the source from moving toward the pulling apparatus as a result of the tension applied to the plastic pipe. A piece of plastic pipe 64 is shown engaged between the upper and lower tires 26 and may for an example have a diameter of approximately four inches. A portion of the newly formed plastic object is manually inserted between the tires 26. At the beginning the plastic object may be a more or less solid rope of perhaps one inch in diameter which must be grasped by the tires so that tension is applied thereto. Rotation of the tires in the indicated direction clockwise for the upper tire and counterclockwise for the lower tire (as viewed in FIG. 1) is accomplished by energizing the motor 50 from suitable electric controls (not shown) so that operation of the motor 50 acting through the gearbox 52 causes rotation of the drive shaft 56 and the axles 22 and 30 in the proper direction to give powered rotation to the tires 26. Such rotation of the tires 26 applies tension to the pipe 64 causing it to move from right to left as viewed in FIGURE 1. Pressurizing the rod end of the cylinder 36 through the rod end connection 39 applies a downward force to the upper tire 26 which in turn applies frictional force to the pipe 64 proportional to the amount of pressure admitted to the rod end of the cylinder 36 and is entirely controllable in amount by a control valve of a type well known in the art.

It is to be appreciated that whenever desirable, as at the beginning of the operation, the base end of the cylinder 36 can be pressurized to raise he upper tire 26 out of contact with the lower tire 26 to allow the plastic object to be placed in position resting on the lower tire 26 after which pressurization of the rod end of the cylinder 36 through the rod end connection 39 lowers the upper tire 26 into the position shown in the figures.

The motion of a plastic object such as pipe 64 from right to left in normal operation is a relatively slow movements so that if desirable a workman can grasp the pipe 64 for instance with a pair of calipers or other tool for measuring the diameter and due to the slowness of the motion might allow the tool or his hands to be drawn into the area of contact between the two tires. Because of this possibility, the handle member 46 is, if desired, positioned forwardly of the contact area of the two tires so that it will be activated as hereinbefore described by any object attached to the pipe and being drawn inwardly toward the area of contact with the result that the pressurization of the cylinder 36 will be transferred from the rod end to the base end with the result that the upper tire 26 is raised out of contact with the lower tire 26 removing the danger of injury to the operator or damage to tools or the apparatus itself.
atbsafi Because the upward force against the upper tire 26 tends to cause misalignment in the upper frame 32 with respect to the guide elements 34 a heavy cylindrical compression type spring 65 is slidably mounted on each of the two guide elements 34 most remote from the tires 26 and is resiliently engaged between a portion of the frame 32 and an adjustable collar 66 rigidly releasably engaged with each guide element 34 upon which a spring 65 is mounted. The effect of the springs 65 is to balance the upward force applied to the upper tire 26 by an equal upward force applied bf the springs 65 to portions of the upper frame 32 remote from the tire 26 to give an approximate balancing of the forces applied to the frame 32 so that action of the cylinder 36 in adjusting the height of the frame 32 is smoothly effected.

For the above description it will be noted that I have provided a new and improved method for pulling an object which maintains a high pulling force regardless of variations in the cross section of the object and does not distort the object during the pulling thereon. Such method is particularily desired in the pulling of a newly formed plastic object as it emerges from a continuous forming apparatus.

What I claim is:

1. The method of pulling an elongated object comprising; rotatively driving at least one wheel member of a pair of wheel members supported for rotation about substantially parallel axes with each of said wheel members having radially deformable outer circumferential surfaces and with at least one of said wheel members being bodily moveable simultaneously with the rotation thereof towards and away from the other of said wheel members with said axes being substantially parallel in all relative positions of said wheel members; continuously applying during said driving a force urging at least said one of said wheel members, which is bodily moveable, towards the other of said wheel members; continuously pulling an elongated object between said wheel members along an axis extending substantially normal to the plane containing said axes while maintaining adjacent portions of each of said circumferential surfaces in a deformed condition by engagement with the object throughout the pulling thereof to provide a large area of engagement with the object; and automatically releasing said force during such pulling and upon the pulling inwardly toward the area of contact between said circumferential surfaces of an undesired object whereby said one of said wheel members, which is bodily moveable, moves bodily away from the other of said wheel members.

2. The method as set forth in claim 1 in which only one of said wheel members is bodily moveable.

3. The method as set forth in claim 1 in which said driving is of at least one of a pair of wheel members each of which has an encompassing pneumatic tire inflated to a pressure such that the outer circumferential surface thereof is readily deformable.

4. The method as set forth in claim 3 in which only one of said wheel members is bodily moveable.

5. The method as set forth in claim 1 in which the speed at which said driving occurs is variable.

6. The method as set forth in claim 1 and additionally counterbalancing the force exerted by the object upon frame means supporting said one of said wheel members which is bodily moveable.

References Cited by the Examiner
UNITED STATES PATENTS

| | | | |
|---|---|---|---|
| 2,326,671 | 8/1943 | Patterson | 226—175 |
| 2,525,590 | 10/1950 | Collins | 226—186 X |
| 2,670,926 | 3/1954 | Sewell et al. | 226—186 |
| 2,699,195 | 1/1955 | Weller. | |
| 2,924,328 | 2/1960 | Lidderdale | 226—176 |
| 3,132,787 | 5/1964 | Rayfield | 226—176 |

M. HENSON WOOD, JR., *Primary Examiner.*

J. N. ERLICH, *Assistant Examiner.*